United States Patent
Smith-Rose et al.

(10) Patent No.: US 12,348,670 B2
(45) Date of Patent: *Jul. 1, 2025

(54) COMPUTER-BASED SYSTEMS CONFIGURED FOR CALLER IDENTIFICATION DIFFERENTIATION AND METHODS OF USE THEREOF

(71) Applicant: Capital One Services, LLC, McLean, VA (US)

(72) Inventors: Asher Smith-Rose, Midlothian, VA (US); Shabnam Kousha, Washington, DC (US); Tyler Maiman, Melville, NY (US); Lin Ni Lisa Cheng, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,104

(22) Filed: Oct. 9, 2023

(65) Prior Publication Data

US 2024/0040033 A1 Feb. 1, 2024

Related U.S. Application Data

(63) Continuation of application No. 17/716,905, filed on Apr. 8, 2022, now Pat. No. 11,785,138.

(51) Int. Cl.
*H04M 3/42* (2006.01)
*G06N 20/00* (2019.01)
*G06Q 30/0282* (2023.01)

(52) U.S. Cl.
CPC ........ *H04M 3/42068* (2013.01); *G06N 20/00* (2019.01); *H04M 3/42042* (2013.01); *G06Q 30/0282* (2013.01)

(58) Field of Classification Search
CPC .......... H04M 3/42068; H04M 3/42042; G06N 20/00; G06Q 30/0282
USPC ...................................... 348/142.05
See application file for complete search history.

(56) References Cited

U.S. PATENT DOCUMENTS

| | | | | |
|---|---|---|---|---|
| 5,864,612 A | * | 1/1999 | Strauss | H04M 3/42042 379/230 |
| 6,618,474 B1 | * | 9/2003 | Reese | H04M 3/4878 379/215.01 |
| 6,768,792 B2 | | 7/2004 | Brown et al. | |
| 6,775,363 B2 | * | 8/2004 | Conn | H04M 15/83 379/114.12 |
| 7,120,235 B2 | * | 10/2006 | Altberg | G06Q 30/02 705/14.54 |

(Continued)

*Primary Examiner* — Binh Kien Tieu
(74) *Attorney, Agent, or Firm* — Greenberg Traurig, LLP

(57) ABSTRACT

Systems and methods of caller identification differentiation via machine learning techniques are disclosed. In one embodiment, an exemplary computer-implemented method may include: receiving a permission indicator identifying a permission by the user to detect calls being received by a computing device; receiving an indication of a current call being received; utilizing a trained call differentiation machine learning model to determine a likelihood that the current call is of a first call type or a second call type, where the first call type is associated with a first type of activity and the second call type is associated with a second type of activity.

20 Claims, 8 Drawing Sheets

(56) References Cited

U.S. PATENT DOCUMENTS

| | | | | |
|---|---|---|---|---|
| 7,215,750 | B2* | 5/2007 | Nguyen | H04Q 3/0016 379/114.03 |
| 7,283,625 | B2 | 10/2007 | Urban et al. | |
| 8,660,247 | B1* | 2/2014 | Brown | H04W 4/18 379/142.06 |
| 9,025,747 | B2 | 5/2015 | Chmara et al. | |
| 2003/0092432 | A1* | 5/2003 | Hwang | H04M 1/575 379/142.01 |
| 2003/0128821 | A1* | 7/2003 | Luneau | H04M 1/578 379/88.21 |
| 2006/0116105 | A1* | 6/2006 | Frankel | H04M 15/7556 455/406 |
| 2007/0047523 | A1 | 3/2007 | Jiang | |
| 2011/0205936 | A1* | 8/2011 | Vanier | H04M 15/75 379/142.04 |
| 2014/0376705 | A1* | 12/2014 | Layman | H04M 3/38 379/114.14 |
| 2018/0103358 | A1 | 4/2018 | Chiang | |
| 2018/0309801 | A1* | 10/2018 | Rathod | H04M 3/5175 |
| 2021/0182039 | A1 | 6/2021 | Cappello et al. | |
| 2022/0210172 | A1 | 6/2022 | Tan et al. | |

* cited by examiner

COMPUTER-BASED SYSTEMS CONFIGURED FOR CALLER IDENTIFICATION DIFFERENTIATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more practical technological improvement applications utilizing one or more machine learning techniques to curate additional caller information to enhance caller line identification information (e.g., caller ID), including, but not limited to, augmenting caller ID with information related to differentiated caller identification.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one exemplary technological problem exists when legitimately-purposed calls from unknown phone numbers may not be distinguished from spam based on activity patterns specific to the calling parties. Yet another exemplary technological problem may exist when calling party information dynamically procured from various sources according to caller identification is not sufficient to differentiate from spammers.

SUMMARY OF DESCRIBED SUBJECT MATTER

In some embodiments, the present disclosure provides various exemplary technically improved computer-implemented methods involving caller identification differentiation, the method including steps such as: obtaining, by one or more processors, a trained call differentiation machine learning model that determines a likelihood that a particular call associated with a particular phone number is of a first call type or a second call type, where the first call type is associated with a first activity and the second call type is associated with a second activity; receiving, by the one or more processors, from a computing device of a first user, a permission indicator identifying a permission by the first user to detect calls being received by the computing device; receiving, by the one or more processors, from the computing device, an indication of a current call being received at a current time from a particular phone number that is associated with a second user; utilizing, by the one or more processors, the trained call differentiation machine learning model to: determine an activity type associated with the second user, determining an activity qualifier associated with the second user based at least in part on the activity type, and determine the likelihood that the current call is of the first call type or the second call type, based at least in part on the current time and the activity qualifier; and instructing, by the one or more processors, when the current call is of the first call type, the computing device of the first user to present to the first user, a graphical user interface (GUI) associated with the current call, where the GUI includes at least one GUI element, displaying, to the first user, information related to the first type of activity of the second user.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
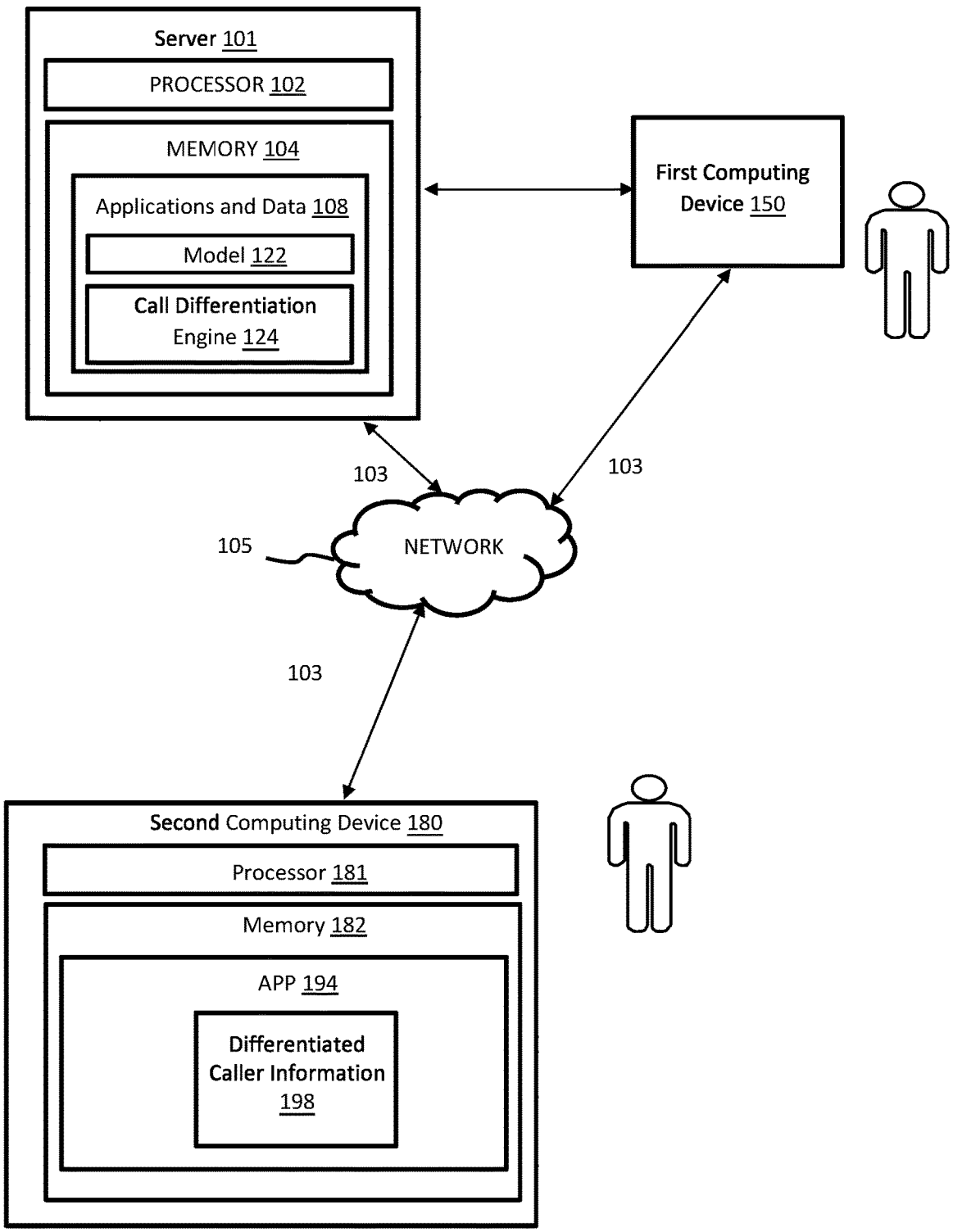
FIG. 1 is a block diagram of an exemplary system and/or platform illustrating aspects of caller identification differentiation, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the diversity of and intelligence gleaned from various communication events and data sources, while at the same time to leverage advanced data processing capabilities, various embodiments of the present disclosure provide for improved computer-based platforms or systems, improved computing components and devices configured for one or more practical technological improvements involving: detecting phone calls received at computing devices of users, determining likelihoods that current calls are of a particular call type differentiated from spam, procuring additional information for the calling parties engaging the particular call type from various sources, displaying the procured additional information in a GUI associated with the current calls, as well as generating intelligence (e.g., trained call differentiation machine learning models, etc.) empowered by the various phone call related events, calling party profile information, contextual information, and/or transaction data, and/or call receiving party profile information, contextual information, and/or transaction data to, for example, automate the functionality of spam-differentiating for calling party's identification with enhanced efficiency, accuracy, relevancy, and accessibility. For example, without limitation, one exemplary technological problem may be addressed by exemplary technological solutions provided by some embodiments of the present disclosure by distinguishing legitimately-purposed calls associated with unknown phone numbers from spam based on activity patterns specific to the calling parties. Yet another exemplary technological problem may be addressed by exemplary technological solutions provided by some embodiments of the present disclosure by dynamically procuring information about calling party(ies) from various sources according to caller identification sufficiently differentiated from spammers in real-time.

Various embodiments disclosed herein may be implemented in connection with one or more entities that provide, maintain, manage, and/or otherwise offer any services involving various transaction data and/or communication(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account.

For purposes of illustration, data structures and/or operations specific to phone calls may be used herein as non-limiting examples to describe some embodiments of the present disclosure. Various aspects of various disclosed technological improvements may apply to communications at various modalities. For example, the curated caller information may be used to augment record(s) associated with identification(s) of a user's (e.g., communication initiating small business owner's), for example, email address, chatting account, social media account, and so on. Correspondingly, the curated additional caller information may be dynamically displayed to another user in receipt of an incoming communication initiated by the user via various communication modalities. By way of non-limiting examples, such communications may be in the forms of an SMS, an MMS, an email, a voice message, a chatting message, a social media message, a push message of an application, and the like, not limited by the embodiments illustrated herein.

FIG. 1 depicts an exemplary computer-based system 100 illustrating aspects of technologically improved caller identification differentiation via utilization of at least one machine learning technique, in accordance with one or more embodiments of the present disclosure. An exemplary system 100 may include at least one server 101, and at least one first computing device 150 associated with a first user, which may communicate 103 over at least one communication network 105. In some embodiments and in optional combination with one or more embodiments described herein, the system 100 may further include and/or be operatively connected and/or be in communication (e.g., electronic communication, telecommunication) with at least one second computing device 180 associated with a second user, the second computing device 180 may also communicate with via the communication network 105 to, for example, receive phone call(s), SMS message(s), MMS message(s), chat application message(s), social media message(s), and the like, from the first computing device 150.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution, such as a credit card company that services an account of the user, and thereby having access to transactions performed by various users in addition to their respective account information. For example, the second user may incur a transaction with the first user, using a transaction card issued by the credit card company, with a computing device of a merchant (not shown herein) either online or at a point of sale (POS) device of the merchant via placing an order for a good, a service, or some combination thereof. As illustrated with more details below, in some embodiments, the first user may operate as a small business owner (e.g., a sole proprietor) and utilize the same phone number for conducting both business calls and personal calls.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may utilize one or more machine learning techniques to provide all or portions of the features and/or functionality associated with caller identification differentiation, in conjunction with or independent of caller identification differentiation functionality implemented at the first computing device 150 and/or the second computing device 180.

In some embodiments, the features and functionality may include operations such as: obtaining training data (e.g., training information of a plurality of users (e.g., small business owners), training activity information associated with a plurality of activities associated with the plurality of users, training phone number information of a plurality of phone numbers associated with a plurality of calls (of at least a first call type or a second call type) from the plurality of users to a plurality of call receiving users, training timing information associated with the plurality of users engaging the plurality of activities and/or initiating the plurality of calls, and/or training profile information, contextual information, and/or transaction data associated with the plurality of users and/or call receiving users); obtaining a trained call differentiation machine learning model that determines a likelihood that a particular call associated with a particular phone number is of a first call type or a second call type, where the first call type is associated with a first type of activity and the second call type is associated with a second type of activity; receiving an indicator identifying a permission by the second user to detect phone calls, emails, messages, and/or other communications received at the second computing device of the second user; receiving an indication that at least one communication is received by the second user from the first user; utilizing the trained call differentiation machine learning model to determine: 1) an activity type associated with the first user, 2) an activity qualifier associated with the first user based at least in part on the activity type, and 3) the likelihood that the current call is of the first call type or the second call type, based at least in part on the current time and the activity qualifier; and instructing the second computing device to, when the current call is of the first call type, display information related to the first type of activity of the first user to the second user. In some embodiments not shown herein, the features and functionality of the server 101 may be partially or fully implemented at the first computing device 150 and/or the second computing device 180 such that the illustrative process to provide caller identification differentiation may be performed partially or entirely on the second computing device 180.

In some embodiments, the application(s) and data 108 may include an exemplary trained call differentiation machine learning model 122. In some embodiments, the trained call differentiation machine learning model 122 may be trained utilizing the server 101 and/or utilizing at least one remote processor. In other embodiments, the trained call differentiation machine learning model 122 may be obtained when an initial call differentiation machine learning model would have been trained by another entity with the training data provided by another entity, and/or with the training data provided by server 101, to obtain the trained call differentiation machine learning model 122. In some embodiments, the first computing device 150 and/or the second computing device 180 may be utilized to train the initial call differentiation machine learning model and/or re-train the trained call differentiation machine learning model 122. In the latter case, the trained call differentiation machine learning model 122 may be trained and/or re-trained with training data specific to the first user and/or the second user at their respective computing devices. In one example, the trained call differentiation machine learning model 122 may be trained as a user-specific (e.g., merchant-specific) machine learning model.

Various machine learning techniques may be applied to train and re-train the initial and trained call differentiation machine learning model with training data and feedback data, respectively. In some embodiments, the training data may include various information related to transaction events and communication events. By way of non-limiting examples, the training data may include transaction dates, transaction time, time lapses between transactions relative to business hours (e.g., learned or otherwise obtained), time lapses since transactions occurred, and the like. In various implementations, such a machine learning process may be supervised, unsupervised, or a combination thereof. In some embodiments, such a machine learning model may include a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutioal network (e.g., U-net) or other suitable network. In some embodiments and, optionally, in combination of any embodiment described above or below, an exemplary implementation of neural network may be executed as follows:
  a. Define Neural Network architecture/model,
  b. Transfer the input data to the exemplary neural network model,
  c. Train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination with any embodiment described above or below, the exemplary trained call differentiation machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include a call differentiation engine 124 that may be programmed to execute the exemplary trained call differentiation machine learning model 122. In some embodiments, the call differentiation engine 124 may receive, as input, an indication of a call incoming at a particular time from a phone number associated with the first user yet unknown to the second user. In some embodiments, the trained call differentiation machine learning model 122 may receive input of various other information such as, but not limited to, transaction dates, transaction time, time lapses between transactions relative to business hours (e.g., learned or otherwise obtained), time lapses since the last transaction(s) occurred, and the like. As an output, the call differentiation engine 124 may utilize the trained call differentiation machine learning model 122 to determine a likelihood that a particular call associated with the phone number is of a particular call type (e.g., a first call type or a second call type, the first call type associated with a first type of activity and the second call type associated with a second type of activity) for augmenting the caller ID information associated with the call. In some embodiments, the likelihood information may be used to procure additional information with regard to the type of activities of the first user. In one example, when the particular call is determined as of a first call type (e.g., a business call type), additional information of the business operations of the first user may be obtained and used to augment the caller ID information associated with the particular call, in addition to or separately from notifying to the second user of the particular call not being spam. More details of the procurement of such additional information of the activities of the first type and notification to the second user are described with reference to FIGS. 2, and 3A-3C, below.

Still referring to FIG. 1, an illustrative second computing device 180 associated with the second user may include: one or more processors 181 and a non-transient computer memory 182. Memory 182 may store instructions that, when executed by the one or more processors 181, perform various procedures, operations, or processes consistent with disclosed embodiments. In one embodiment, the memory 182 may include an application (APP) 194 that, when executed by the one or more processors 181, may perform operations such as: prompting the second user for a permission to detect communications via the second computing device 180 (e.g., phone calls, SMS, emails, etc.); detecting communications via the second computing device 180 according to the permission obtained from the second user; receiving, and/or storing differentiated caller information 198; and triggering the second computing device 180 into displaying the differentiated caller information as part of the caller ID information associated with the phone number of the first user, to the second user, upon detecting a call incoming from such a phone number. By way of non-limiting examples, the differentiated caller information 198 may include information such as an activity type of the first user associated with a timing condition, or information related to the activities of the first activity type of the first user (e.g., a title related to the first type of activity, an address related to the first type of activity, or a description of the first type of activities, and so on). In one example, when the activity type is related to the first user operating a business thereof, the information may include a business name, an address of the business, business hours, contacts (e.g., a web link of the business, a social media link of the business, a messaging link, a reservation link, other phone number(s), fax number(s)), photo(s), customer review(s), promotional information, description of the business (e.g., lunch menu, dinner menu), survey information, and so on.

In various embodiments, the application 194 may be implemented in any suitable manner such as, without limitation, a standalone application, a browser extension, and the like. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the second computing device 180. For instance, such an application may be configured to detect a variety of communications of the second user at the second computing device 180, intercept those communications at the second computing device 180, monitor those communications at the second computing device 180, and/or interject one or more suitable controls (e.g., user operable controls) over those communications at the second computing device 180. In some embodiments, such an application may be configured to obtain information of the communication transmitting party(ies) (e.g., the calling phone number), information of the communication (e.g., the calling time of a phone call), the content of the communication (e.g., the identity of an SMS sending entity, the content of the conversation of a phone call). In some embodiments, such an application may be configured to obtain permissions from the second user in order to execute all or part of the exemplary functionality described above. In some embodiments, the application 194 may be configured to execute on the first computing device 150 as well.

In some embodiments, for the purpose of simplicity, features and functionalities associated with the exemplary trained call differentiation machine learning model 122 (e.g., training, re-training, etc.) are illustrated as implemented by components of server 101. It should be noted that one more of those call differentiation machine learning model-related aspects and/or features may be implemented at or in conjunction with the second computing device 180 of the second user. For example, in some embodiments, the initial call differentiation machine learning model may be partially trained at the server 101 with, for example, other users' information (e.g., activity information, transaction information, etc.) and phone call events, then in turn transmitted to the second computing device 180 (and/or the first computing device 150) to be fully trained with, for example, the second user (and/or the first user) specific information and phone call events. In another example, the converse may be performed such that the initial machine learning model may be initially trained at the second computing device 180 (and/or the first computing device 150) and subsequently transmitted to the server 101 for application and/or further training with training data from other users.

Further, the local differentiated caller information 198 may also be stored entirely on the second computing device 180, in conjunction with the server 101, or entirely at server 101. In some embodiments, when the call differentiation machine learning model is trained or re-trained at the second computing device 180 (and/or the first computing device 150), the trained call differentiation machine learning model 122 may be utilized to, at least with regard to the activity type of the first user, generate or update the activity type and/or additional information associated with the activity type of the first user, locally or in conjunction with the server 101. In an embodiment, the first computing device 150 and/or second computing device 180 may be configured to synchronize a local collection of differentiated caller information to the server 101 for storage and/or access by computing devices of other users. In some implementations, the synchronization may be performed in any suitable manner, such as, for example, in a pushing manner initiated by the first computing device 150/the second computing device 180, in a pulling manner initiated by the server 101, or in combination thereof.

Various embodiments associated with FIG. 1 and related disclosure herein solve a technical problem of differentiating calls from unknown phone numbers as non-spam based on activity patterns specific to calling parties. Aspects of the disclosed procurement of additional information related to activities of the calling parties via dynamic sourcing also yield more accurate, informative, efficient and otherwise improved utilization of both processing and communication resources, such as via leveraging the exclusive, private access to comprehensive user data (both training and real user communication events, transaction events, feedback events, etc.) to train and re-train a machine learning model, using the trained machine learning model to determine at least one of an activity type associated with a calling party, an activity qualifier associated with the calling party, an activity type associated with a call receiving party such that to discern a likelihood that a current call of the calling party from a phone number unknown to the call receiving party is of a call type sufficiently differentiated from spam (e.g., with a likelihood score). As a result, the call receiving party can be guarded against true spam imposing telecommunication security issues in an improved manner that is no longer a blanket application labeling all calls from unknown phone numbers as spam. Rather, exemplary technological improvement disclosed herein enables the filtering of legitimate communications by leveraging machine learning model powered analysis of profile information, contextual information, as well as transactional information of the communication parties. Moreover, various exemplary embodiments enabled by the disclosed procurement of additional information related to activities of calling parties may allow for improved responsiveness, efficiency, accuracy, and expanded accessibility in terms of providing data informative of the particular role of the calling party, thereby increasing telecommunication security and/or reducing or eliminating the need for unnecessary processing caused by privacy-invading if not fraudulent actions otherwise avoided by the present differentiated caller information procurement mechanisms.

While only one server 101, first computing device 150, network 105, and second computing device 180 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For instance, in some embodiments, the feature and functionality of the server 101 may be partially, or fully implemented at the first computing device 150 and/or the second computing device 180.

Figure 2:
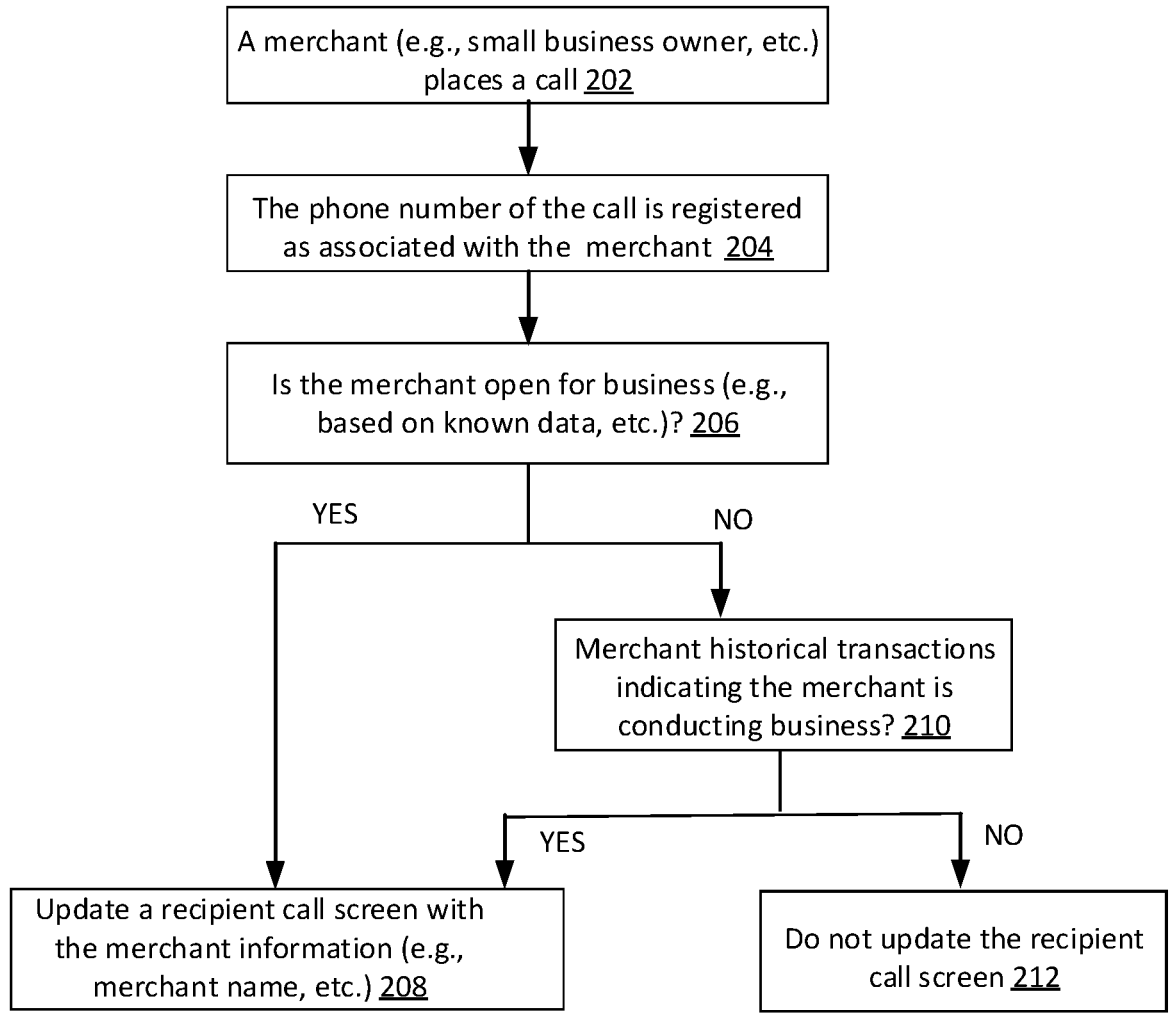
FIG. 2 is a diagram illustrating an exemplary process involving aspects and features associated with caller identification differentiation, consistent with exemplary aspects of certain embodiments of the present disclosure.

FIG. 2 is a diagram illustrating an exemplary differentiation of caller identification using one or more machine learning techniques, consistent with exemplary aspects of certain embodiments of the present disclosure. In this illustrated embodiment, an exemplary caller identification differentiation system providing exemplary time-sensitive and/or transaction-sensitive caller identification information for calls placed by (202) a merchant (e.g., small business owner, the first user of FIG. 1, etc.) and received at a device of a recipient (e.g., a customer of the merchant, the second user of FIG. 1, etc.). Notably, it tends to be a common practice for a small business owner to use the same phone number to conduct both business calls and personal calls. In this example, the phone number may be registered (204) by the merchant or otherwise indicated/established (e.g., in Yelp, Postmates, DoorDash, etc.) as associated with a business thereof, and thus associated with the merchant. On the other hand, despite being associated with the merchant (or the merchant's business and the like), the phone number may still remain unknown to the call recipient. For example, via the current technologies, when the call recipient and the merchant have communicated in the past (e.g., the call recipient may have called several mechanics nearby to fix a car problem, or eateries nearby to order food deliveries or pickups, etc.), absent the call recipient's affirmative actions to store the merchant's phone number in a phonebook of contacts residing on the device thereof, the phone number of the merchant may still be indicated as unknown or spam risk in association with calls place therefrom.

In the illustrative embodiment shown in FIG. 2, the exemplary caller identification differentiation system may be configured to utilize a trained call differentiation machine learning model to determine (206) whether the merchant is open for business at the particular point of the time when the call is initiated at step 202. Details with regard to the trained call differentiation model are similar to those described above with reference to FIG. 1, and are not repeated. In some embodiments, and as illustrated in this example, upon determining that the merchant is open for business at step 206, the exemplary caller identification differentiation system may instruct the device of the recipient to update (208) a call screen thereof such that the call is not indicated as spam or unknown (but rather a call differentiated from spam). In some implementations, the merchant information may be displayed to the recipient as well. By way of non-limiting examples, the merchant information may be rendered and/or displayed to the recipient as part of the caller ID information as illustrated with reference to FIGS. 3B-3C, below. In other embodiments, the merchant information may be rendered and/or displayed to the recipient in any suitable form or format, such as and not limited to, an audio message, a tone, a push notification, an animated notification, a user-configured notification form/format, and the like.

In some embodiments, the merchant information may include any information pertaining to the merchant and/or merchant's business. By way of non-limiting examples, the merchant information may include one or more of: the merchant's name, business name, business address, business hours, website of the business, social media sites/accounts associated with the merchant/business, a messaging link, a reservation link, other phone number(s), fax number(s), photo(s), customer review(s), promotional information, description of the business (e.g., lunch menu, dinner menu), survey information, and so on. Various embodiments herein may be configured such that the merchant information can by dynamically sourced from various data reservoirs or information hosting platforms. For example, the merchant information may be procured from the merchant's Yelp website, FourSquare website, social media website, and the like. In some embodiments, the merchant information may be crowdsourced from various users (e.g., customers of the merchant) and stored at the exemplary caller identification differentiation system in association with the phone number of the merchant/identification of the merchant. In one embodiment, the merchant information may be stored as part of the differentiated caller information at the server, and/or the device of the recipient (e.g., the differentiated caller information 198).

In some embodiments, and as illustrated in this example, upon determining that the merchant is not open for business at step 206, the exemplary caller identification differentiation system may further determine (210) whether the merchant is conducting a business call at step 202 based on the merchant's historical transactions. According to some aspects of the present disclosure, the exemplary caller identification differentiation system may utilize the trained call differentiation machine learning model 122 to perform a secondary prediction (e.g., secondary verification/adjustment) with regard to the merchant's capacity associated with the call initiated in step 202, more details of which are described with reference to FIG. 4, below.

In some embodiments, when in the secondary verification using the merchant's historical transactions indicates that the merchant is conducting a business call at step 202, the exemplary caller identification differentiation system may similarly instruct the device of the recipient to update (208) a call screen thereof such that an indication of non-spam and/or the merchant information may be displayed to the recipient.

In other embodiments, when in the secondary verification using the merchant's historical transactions indicates that the merchant is not conducting a business call at step 202, the exemplary caller identification differentiation system may instruct the device of the recipient not to update (212) a call screen thereof. In some embodiments and as illustrated with reference to FIG. 3A below, the caller ID information displayed to the recipient may default to the information configured or available for representation to the recipient upon receiving calls from unknown numbers (e.g., unknown call or spam risk).

Various embodiments herein may be configured such that steps 206 and 210 can be performed in a different order. For example, the determination with regard to the merchant's calling capacity may be performed based on the merchant's historical transactions (and/or other transactional data involving the merchant and the recipient) prior to determining whether the calling time falls within predicted business hours of the merchant.

Figure 3C:
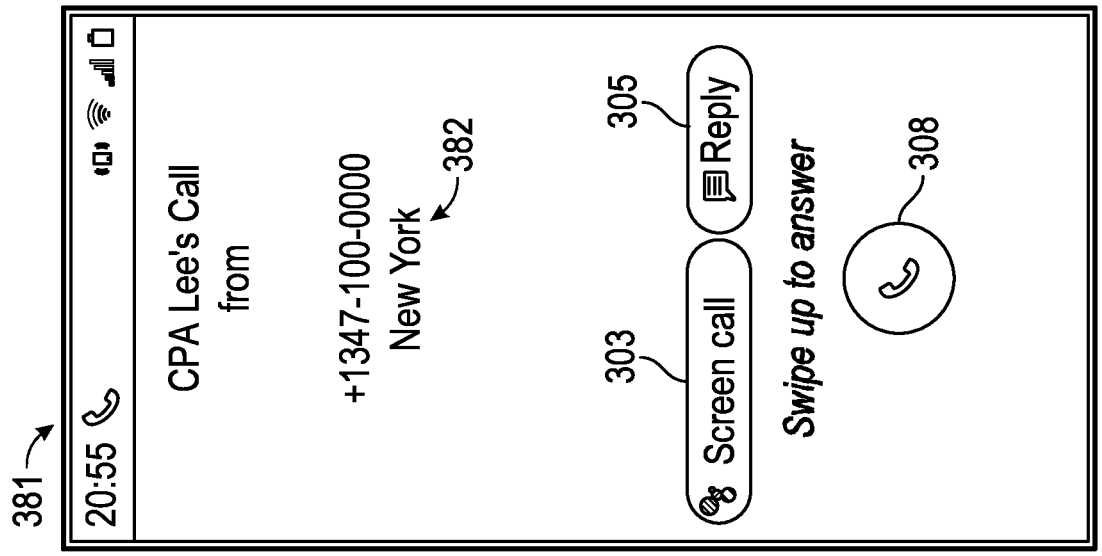
FIGS. 3A-3C are diagrams illustrating exemplary graphical user interfaces (GUIs) involving aspects and features associated with caller identification differentiation, consistent with exemplary aspects of certain embodiments of the present disclosure.
Figure 3B:
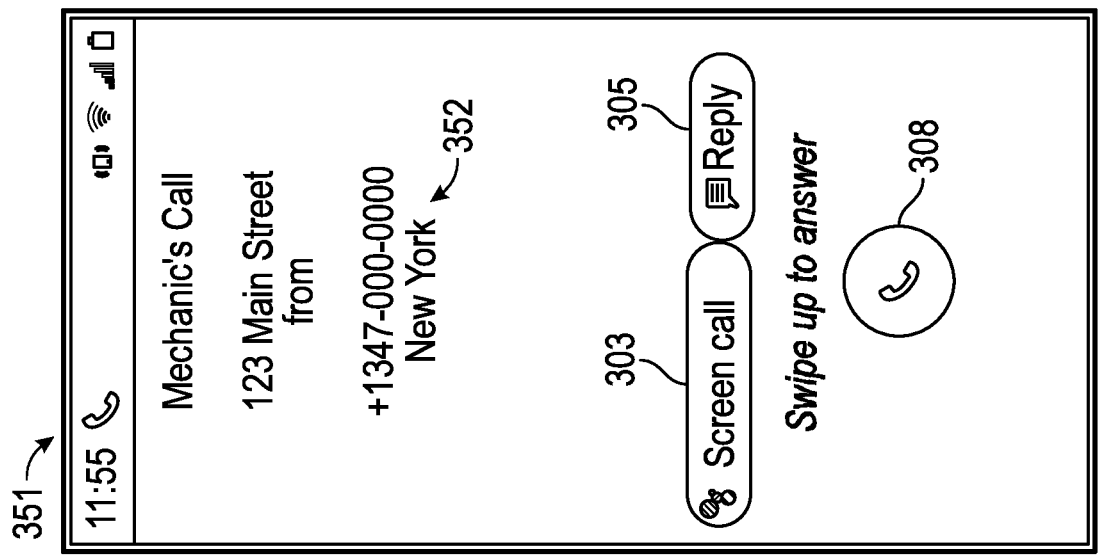
Figure 3A:
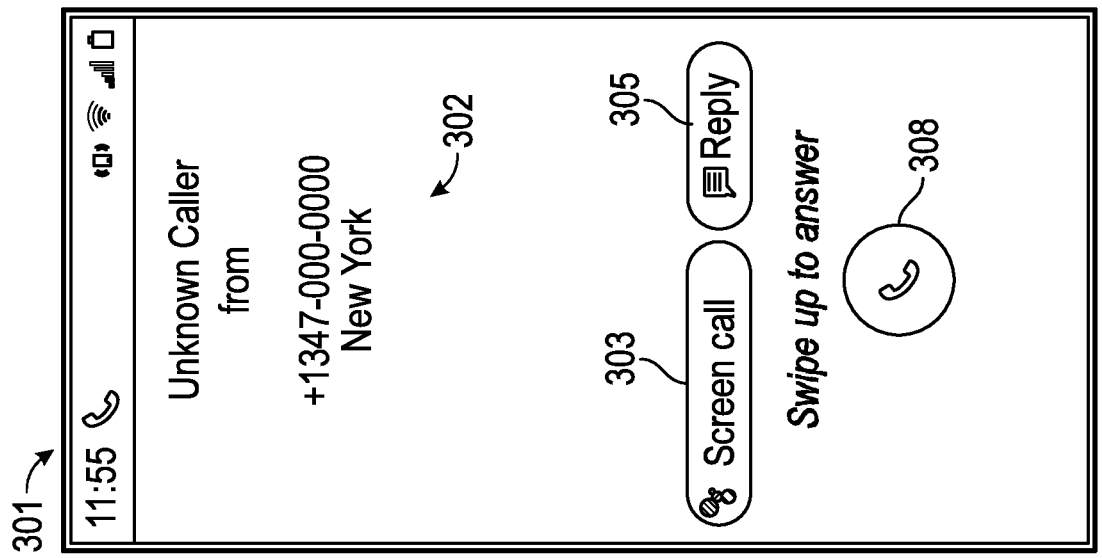

FIGS. 3A-3C are diagrams illustrating exemplary graphical user interfaces (GUIs) involving aspects associated with caller identification differentiation, consistent with exemplary aspects of certain embodiments of the present disclosure. In some embodiments, the GUIs may be provided by an illustrative application (e.g., the application 194 executing on the second computing device 180) and shown on a display of a mobile device (e.g., the second computing device 180) of a user.

In some embodiments, and as shown in FIGS. 3A-3C, the illustrative application 194 may be configured to display the differentiated caller identification information (e.g., role-specific caller information, call-type-specific caller information, etc.) to the user as part of the caller ID information (e.g., an enhanced GUI for representing caller ID). For instance, the application 194 may be configured to make an API request (e.g., a push call) to the phone interface application (e.g., the native phone application configured to display conventional caller ID information on the display of the mobile device) to pass the information of the differentiated caller identification information, for example, as a parameter to the phone interface application. As a result, upon receiving the information of the differentiated caller identification information, the phone interface application may be configured to display the information such as the differentiated caller identification information on the display of the mobile device.

Any suitable techniques may be implemented to represent and notify to the user of the differentiated caller identification information, not limited by the embodiments illustrated herein. By way of non-limiting examples, the differentiated caller identification information may be provided to the user using media such as an audio message, a graphical display (e.g., a banner, a floating window overlaying the GUI of the native phone interface application, etc.), a push notification, a textual display at the GUI elements of a home screen of the computing devices, and so on.

FIG. 3A illustrates an exemplary GUI 301 of the illustrative application (e.g., the application 194) for displaying caller ID information to the user upon a call incoming at the mobile device. The GUI 301 may include a caller ID 302, and a set of buttons 303, 305, and 308 for the user to select. Here, the caller ID 302 may be configured to display to the user that the call is from a calling party associated with a calling phone number, i.e., "1-347-000-0000," and "New York" as the area associated with the phone number's area code.

In this illustrative embodiment, the phone number may have been determined as not associated with a call type differentiated from spam, or, as described above with reference to FIG. 2, not associated with a business call placed within the predicted caller's (e.g., merchant's) business hours or a business call predicted based on the caller's (e.g., merchant's) historical transactions. Thus, the application 194 may not further obtain any additional information of the caller (e.g., merchant), absent any notification of the triggering condition of the call being differentiated from spam calls. That is, when not differentiated as non-spam, the call from the phone number unknown to the user and incoming at the mobile device may be represented as, for example, spam risk or unknown, to alert the user accordingly. As a result, at the GUI 301, the caller ID information may not be augmented and hence displayed without any additional caller information. For example, using the native caller ID feature of the mobile device, the caller ID information may be determined as "Unknown Caller" based on that the particular phone number "1-347-000-0000" is unknown to the user. As such, here in FIG. 3A, the GUI 301 may be configured to display the caller ID 302 as "Unknown Caller from 1-347-000-0000 New York."

Here, at GUI 301, the user can interact with the selectable options to perform actions with regard to the pending incoming call. In this example, the user can select the button 303 to screen the incoming call, select the button 305 to reply with a message, or select the button 308 to swipe up to answer the incoming call. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using toKENs (SHAKEN) to identify calls associated with spoofing phone numbers, and the like.

Further, the user may perform other actions upon the incoming call in addition to or in place of those illustrated in FIG. 3A. For example, the user can interact with the GUI 301 to decline the incoming call while it is still pending, report the phone number included in the caller ID 302 to a server (e.g., the server 101 of FIG. 1) or log locally as associated with a business call from the caller without screening the call or after screening the call, report the phone number or log locally as associated with a business call from the caller after selecting the button 308 to answer the call, report the phone number or log locally as not associated with a business call from the caller after selecting the button 308 to answer the call, and the like.

FIG. 3B illustrates an exemplary GUI 351 of the illustrative application (e.g., the application 194) for displaying caller ID information to the user upon a call incoming at the mobile device. The GUI 351 may include a caller ID 352, and a set of buttons 303, 305, and 308 for the user to select. Here, similar to the GUI 301, the caller ID 352 may be configured to display to the user that the call is from a caller associated with a calling phone number, i.e., "1-347-000-0000," and "New York" as the area associated with the phone number's area code. The difference here is that the calling phone number may have been determined as associated with a business call from the caller (e.g., merchant), or, as described above with reference to FIG. 2, the phone number may be determined as associated with a business call placed within the predicted caller's (e.g., merchant's) business hours (e.g., 11:55 may be determined as falling into the mechanic's business hours). Thus, the application 194 may be provided with the additional information of the caller that pertains to the particular call. As a result, at the GUI 351, the caller ID information may be augmented with the caller's activity (e.g., activity type) information. For example, using the augmented information notified to the application 194, the differentiated caller ID information may be determined and displayed as "Mechanic's Call" even though the particular phone number "1-347-000-0000" is unknown to the user.

In some embodiments, and as shown here in FIG. 3B, the differentiated caller identification information determined may include further information with regard to the particular activity type (e.g., business operations) associated with the call differentiated from spam. In some implementations, the information related to the particular activity type engaged by the caller via initiating the particular call may be obtained as described above with reference to FIG. 2. By way of non-limiting examples, once the call is differentiated as a business call from spam, the caller identification information may include information related to the merchant, the merchant's business, and the like. In one example, the information related to the merchant's business may include the business/service type of the merchant (e.g., eateries, grocery stores, mechanics, plumbers, catering, tax preparation service, dentists, physicians, baby-sitting, etc.). Here, as shown in FIG. 3B, in addition to determining the incoming call as associated with a Mechanic's business, the differentiated caller identification information may be augmented to include the merchant's business address of "123 Main Street." As such, here in FIG. 3B, the GUI 351 may be configured to display the caller ID 352 as "Mechanic's Call 123 Main street from 1-347-000-0000 New York."

Here, at GUI 351, the user can also select the button 303 to screen the incoming call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3B. For example, the user can interact with the GUI 351 to decline the incoming call while it is pending, report the phone number included in the caller ID 352 to the server (e.g., the server 101 of FIG. 1) or log it locally as associated with a business call from the caller without screening the call or after screening the call, report or log locally the phone number as associated with a business call from the caller after selecting the button 308 to answer the call, report or log locally the phone number as not associated with a business call from the caller after selecting the button 308 to answer the call, and the like.

FIG. 3C illustrates an exemplary GUI 381 for displaying caller ID information to the user upon a call incoming at the mobile device. The GUI 381 may include a caller ID 382 and a set of buttons 303, 305, and 308 for the user to select. Here, similar to the GUIs 301 and 351, the caller ID 382 may be configured to display to the user that the call is from a caller associated with a calling phone number, i.e., "1-347-000-0000," and "New York" as the area associated with the phone number's area code. The difference here is that the calling phone number may have been determined as associated with a business call via the secondary verification based on transaction data. In this example, the particular call may be placed at a time that may be determined as outside of the caller (e.g., merchant) business hours (e.g., 20:55 may be determined as outside of a tax accountant's business hours although may be as inside a restaurant's business hours). Nevertheless, the particular call may be determined as associated with a business call based on the caller's historical transactions (e.g., transactions with the user, transactions with other similar users). In some embodiments, a transaction with the user may be incurred afterward (e.g., at the future point of time after the particular call). For example, for a tax return preparation service provided by a CPA, the CPA may initiate the incoming call with regard to fulfilling the service engaged with the user prior to the user completing a transaction with the CPA. In these scenarios, historical transactions may be used together with other suitable contextual information pertinent to the call (e.g., how far into the tax season, how close to the tax due date, called recently within the regular business hours) to perform the secondary verification. Here, even though the particular call is incoming from the CPA at a time outside of the CPA's published business hours, the particular call may be determined as a business call based on the above described transactions and/or other information.

Similarly, the application may be provided with additional information of the caller that pertains to the particular call. As a result, at the GUI 381, the caller ID information may be augmented with the determined differentiated caller identification information. As such, here in FIG. 3C, the GUI 381 may be configured to display the caller ID 382 as "CPA Lee's Call from 1-347-000-0000 New York."

Here, at GUI 381, the user can also select the button 303 to screen the call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3C. For example, the user can interact with the GUI 381 to decline the incoming call while it is pending, report the phone number included in the caller ID 382 to the server (e.g., the server 101 of FIG. 1) or log it locally as associated with a business call from the caller without screening the call or after screening the call, report or log locally the phone number as associated with a business call from the caller after selecting the button 308 to answer the call, report or log locally the phone number as not associated with a business call from the caller after selecting the button 308 to answer the call, and the like.

Figure 4:
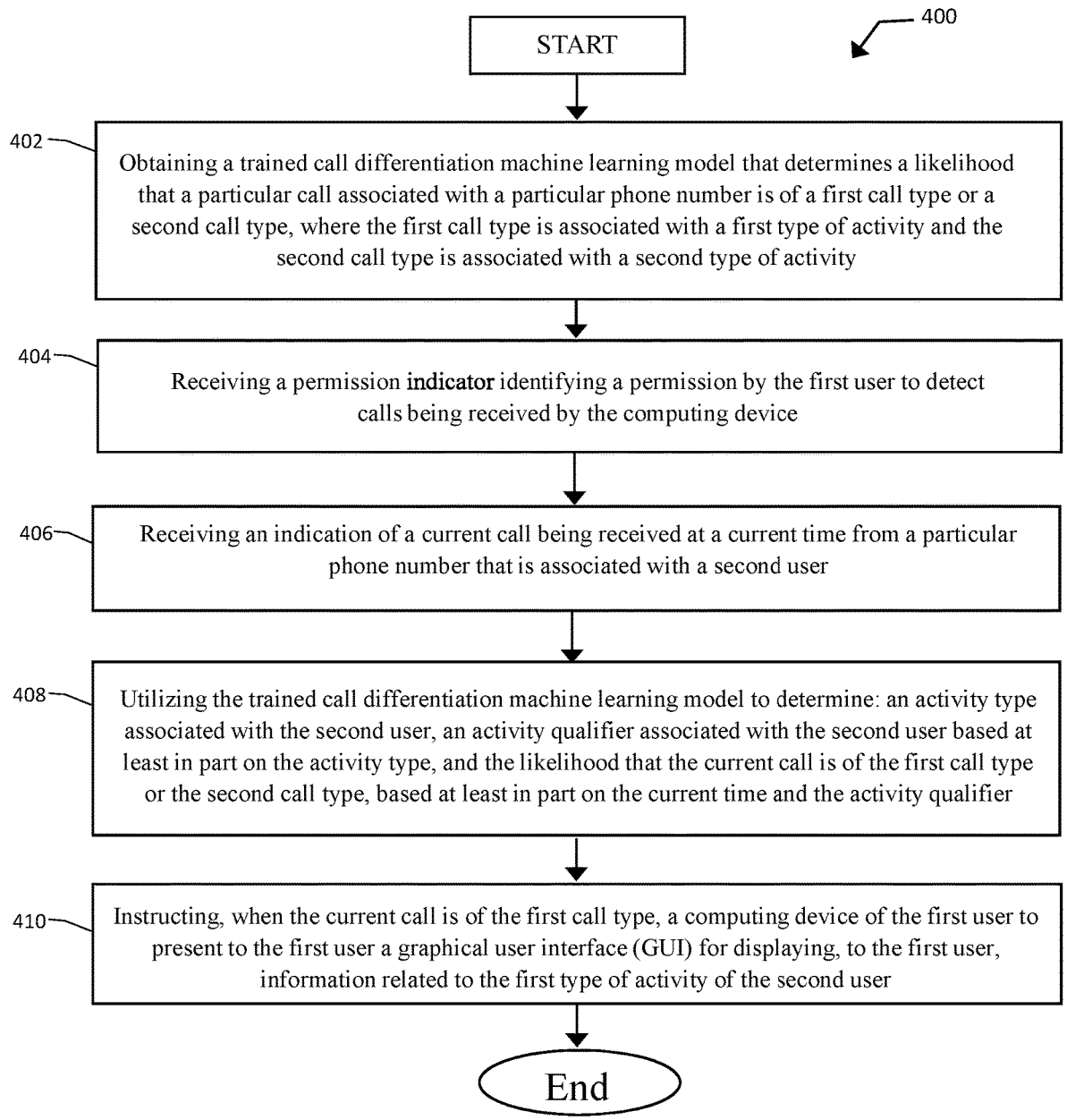
FIG. 4 is a flowchart illustrating an exemplary process related to caller identification differentiation, consistent with exemplary aspects of certain embodiments of the present disclosure.

FIG. 4 is a flow diagram illustrating an exemplary process 400 related to caller identification differentiation via machine learning techniques, consistent with exemplary aspects of at least some embodiments of the present disclosure. Referring to FIG. 4, the illustrative caller identification differentiation process 400 may comprise: obtaining a trained call differentiation machine learning model that determines a likelihood that a particular call associated with a particular phone number is of a first call type or a second call type, where the first call type is associated with a first type of activity and the second call type is associated with a second type of activity, at 402; receiving a permission identifying a permission by the first user to detect calls being received by the computing device, at 404; receiving an indication of a current call being received at a current time from a particular phone number that is associated with a second user, at 406; utilizing the trained call differentiation machine learning model to determine: an activity type associated with the second user, an activity qualifier associated with the second user based at least in part on the activity type, and the likelihood that the current call is of the first call type or the second call type, based at least in part on the current time and the activity qualifier, at 408; and instructing, when the current call is of the first call type, a computing device of the first user to present to the first user a graphical user interface (GUI) for displaying, to the first user, information related to the first type of activity of the second user, at 410. In other embodiments, the caller identification differentiation process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the caller identification differentiation process 400 may include, at 402, a step of obtaining a trained call differentiation machine learning model that determines a likelihood that a particular call associated with a particular phone number is of a first call type or a second call type, where the first call type is associated with a first type of activity and the second call type is associated with a second type of activity. With regard to the disclosed innovation, the call differentiation machine learning model may be trained based at least in part on one or more of: (i) information of a first plurality of users; (ii) activity information associated with a first plurality of activities associated with the first plurality of users; (iii) phone number information of a first plurality of phone numbers associated with a first plurality of calls from the first plurality of users, the first plurality of calls including calls of at least one of: the first call type or the second call type; (vi) timing information of when the first plurality of users engaging the first plurality of activities and/or initiating the first plurality of calls; and/or (v) one or more of profile information, contextual information, transaction data involving the first plurality of users. In some implementations, the first plurality of users may include one or more small business owners (e.g., merchants) who conduct activities that are at least differentiated as a first activity type and a second activity type. Further, the first plurality of users may utilize the same phone numbers to place phone calls related to activities of both the first activity type and the second activity type.

In some embodiments, the first plurality of training activity information associated with the first plurality of activities of the first plurality of users may include various information such as, but not limited to, description of the activities, types of the activities, and so on. Exemplary activity types may include at least a first activity type (e.g., business related) and a second activity type (personal). In some embodiments, the first plurality of activities may be associated with the first activity type. In some implementations, the first activity type may include a business operation type. For example, for a restaurant servicing lunches and dinners, the first plurality of activities of the restaurant owner may include operations related to food preparation and servicing, compliance with regulations, as well as interactions with customers, interaction with vendors, and the like. In some embodiments, activities of the second activity type may include interactions with family members, friends, other service providers (e.g., merchants, dentists, physicians, etc.).

In some embodiments, the plurality of training phone calls may include various phone call events of the first call type, and/or the second call type. In some embodiments, the first call type may correspond to the first activity type and include a business call type; while the second call type may correspond to the second activity type and include a personal call type. In some embodiments, the training activity information and/or the training phone calls may include timing information pertaining to when the first plurality of users have engaged the first plurality of activities, and initiated the first plurality of calls, respectively. Any suitable techniques may be applied to obtain such timing information for training. For example, for each call from the first plurality of users that is of the first call type, the timestamps associated therewith may be used as the training timing information. For another example, information related to the timing when the first plurality of users has engaged in the first plurality of activities may be obtained or otherwise derived from various sources as such, but not limited to, websites (e.g., Yelp, FourSquare, social media sites, other website reporting the timing information), crowdsourced timing information compiled from communications from various customers, and so on. In some embodiments, the timing information related to the first plurality of activities may be obtained or derived from the timestamps associated with the phone calls received and picked up (not going to voice mail) by the first plurality of users.

In some embodiments, additionally or separately, the call differentiation machine learning model may be trained with transaction data associated with the first plurality of users. In some embodiments, the transaction data may include information related to historical transactions that the first plurality of users have processed in association with the first plurality of activities. For example, a restaurant owner may process one or more transactions authorized from the customers thereof from the night before, in the morning prior to opening up for lunch. In this scenario, the restaurant owner may place call(s) to customers to confirm reservations, and the like. Here, based on the above described training, the call differentiation machine learning model may learn that the time the restaurant owner places such call(s) falls outside of the learned or known business hours of the restaurant. Nevertheless, given the patterns of the restaurant owner tends to catchup with the processing of transactions, the call differentiation machine learning model may predict that the restaurant owner is likely calling the customer(s) regarding his/her business.

In some embodiments, additionally or separately, the call differentiation machine learning model may be trained with such transaction data also associated with the call receiving parties of the first plurality of calls. In some embodiments, the transaction data may include information related to historical transactions incurred by the first plurality of activities with these call receiving parties. Continuing from the example above, the restaurant owner may place call(s) to one or more of his/her vendors during the morning time as well. In this scenario, given the above described transaction patterns of the owner and the historical transactions with the vendor(s), the call differentiation machine learning model may predict that, as the vendor(s) may probably be open for business during the morning, the restaurant owner is likely calling the vendor(s) regarding his/her business. In another example, the restaurant owner may place call(s) to the vendors during evening time when the restaurant is open for business. Here, based on the above described training, the call differentiation machine learning model may learn that the time the restaurant owner places such call(s) falls within the learned or known business hours of the restaurant. Nevertheless, given the historical transactions with the vendor(s), the call differentiation machine learning model may predict the call(s) as falling outside of the vendor's business hours and therefore, the restaurant owner may be calling for personal matters.

In some embodiments, the transaction data may include information related to historical transactions incurred by the first plurality of users with the respective call receiving parties. In one example, the restaurant owner may place a call to his/her dentist to make an appointment during the morning prior to opening for business or during business hours. In this scenario, given the historical transactions with the dentist, the call differentiation machine learning model may predict that the restaurant owner is likely calling the dentist regarding personal matters, adjusting from the above-described prediction that the restaurant owner may be operating in a business mode outside of the business hours (e.g., based on the pattern of processing transactions) or within the business hours. Various embodiments herein may be configured that the call differentiation machine learning model may perform the illustrative activity type prediction based on the learned business hours and the illustrative secondary verification/adjustment based on transactions incurred by the first plurality of users and/or transactions between the call receiving parties of the first plurality of calls in any order, not limited by examples herein.

According to some aspects of the disclosure, equipped with the vast amount of data corresponding to calls of the first and/or second activity types, the exemplary trained call differentiation machine learning model may predict first activity hours (e.g., business hours) for callers as an activity qualifier. Given the predicted first activity hours and the timestamp associated with a particular call incoming from the phone number associated with the caller, the call differentiation model may predict a likelihood of whether the particular call is associated with an activity of the first activity type and therefore a call of the corresponding first call type (e.g., business call).

According to some aspects of the disclosure, the caller identification differentiation machine learning model may be trained to use historical transactions (e.g., transactions processed by and/or transaction incurred by) associated with the caller of the particular call to perform secondary verification or adjustment with regard to the prediction based on the predicted business hours. As described above, in some embodiments, the call differentiation model may adjust the particular call placed within the predicted business hours as personal call based on, for example, historical transactions between the caller and the call receiving party to the particular call. In other embodiments, the call differentiation model may adjust the particular call placed outside the predicted business hours as business call based on, for example, historical transactions processed by the caller, and/or historical transactions between the caller and the call receiving party to the particular call.

The user profile information may comprise information relating to one or more of: demographic information, account information, application usage information, any data provided by the user, any data provided on behalf of the user, type of business, location, employee information, management information, revenue information, press release information, product release information, stock information, privacy information, any data provided by the user, and the like. The contextual aspect of the user profile information and user contextual information may comprise information relating to one or more of: a timing, a location of the user, an action of a user, calendar information of the user, contact information of the user, habits of the user, preferences of the user, purchase history of the user, browsing history of the user, communication history, travel history, on-line payment service history, contextual information related to the service provided by the user, profile and/or contextual information of individual(s) the user is associated with, and the like. In some embodiments, the user profile information and/or user contextual information may be provided by the user, detected by a server (e.g., the server 101 of FIG. 1), and/or a component external thereto, or in a combination thereof.

In some embodiments, the call differentiation machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training data, and/or trained models from a third-party data source, third-party machine learning model generators, and the like.

It should be further understood that, in some embodiments, the call differentiation machine learning model may be trained/re-trained via a server in conjunction with a computing device of the user. Here, for example, the server may be configured to initially train a baseline call differentiation model based on the above-described training data of the first plurality of users and/or a plurality of such training data from the plurality of third-party data sources. Subsequently, the baseline call differentiation model may be transmitted to the computing device associated with the user (e.g., the call receiving users and/or call initiating users) to be trained with the particular training data of the user. In other words, a call differentiation model may be trained in various manners and orders as a user-specific model in implementations.

In some embodiments, the call differentiation machine learning model may be re-trained with various feedback data collected via the caller identification differentiation process 400, and the like. For example, via the illustrative GUIs of FIGS. 3A-3C, a call receiving party may report or log locally whether or not a particular call from a call initiating party is indeed a business call. In another example, the illustrative application 194 may monitor the content of the conservation conducted during the particular call and thereby automatically report or log locally whether the particular call from the call initiating party is indeed a business call. In yet another example, the illustrative application 194 may screen the particular call (e.g., screen the voice message left by the particular call, etc.) and thereby automatically report or log locally whether the particular call from the call initiating party is indeed a business call.

The caller identification differentiation process 400 may include, at 404, a step of receiving a permission indicator identifying a permission by the first user to detect calls being received by the computing device; and at 406, a step of an indication of a current call being received at a current time from a particular phone number that is associated with a second user. In some embodiments, the permission indicator may be received from an application such as the application 194 executing on a computing device of the user. The details are similar to those described with reference to FIG. 1, and not repeated herein. In other embodiments, the permission indicator may be received from an application such as a web page allowing the user to configure his or her settings at a web browser. The user may configure the settings related to calls, and/or other communication detection capabilities for various computing devices thereof. That is, the permission indicator may be received from an application and/or a computing device other than the application for detecting calls (and other communications), or the computing on which the call detecting/protection application is executing. In some embodiments, the indication of the current call may be received from the above described computing device of the first user. In one embodiment, the indication of the current call may be received from the illustrative application 194 executing on the computing device.

The caller identification differentiation process 400 may include, at 408, a step of utilizing the trained call differentiation machine learning model to determine: an activity type associated with the second user, an activity qualifier associated with the second user based at least in part on the activity type, and the likelihood that the current call is of the first call type or the second call type based at least in part on the current time and the activity qualifier. In some embodiments, the activity type associated with the second user may include a first type of activity and a second type of activity. In some implementations, and as described above, the first type of activity may include a business related type, and the second type of activity may include a personal type. According to some aspects of the disclosure, historical transactions of the first user, of the second user, and/or between the first user and the second user may be utilized to determine the activity type. For example, if the first user has incurred previous transaction(s) with the second user, the first user might be a customer of the second user and hence the activity type may be a business related type. In other embodiments, the activity type may be determined based on the timing information (e.g., time of the day), and/or pertinent profile/contextual information of the first user and/or the second user. In some embodiments, the activity qualifier may include information such as, but not limited to, operating hours associated with the first type of activity of the second user.

The caller identification differentiation process 400 may include, at 410, a step of instructing, when the current call is of the first call type, a computing device of the first user to present to the first user a graphical user interface (GUI) for displaying, to the first user, information related to the first type of activity of the second user. In some embodiments, the computing device may include the computing device of the first user described above. As illustrated with reference to FIGS. 3B-3C, in some embodiments, the GUI may be presented in association with the current call. In some implementations, the GUI may include at least one GUI element for displaying to the first user, information related to the first type of activity of the second user. Various implementations may be configured such that the information related to the first type of activity of the second user may include a title related to the first type of activity, an address related to the first type of activity, or a description of the first type of activities of the first user.

In some embodiments, the caller identification differentiation protection process 400 may further include a step of utilizing the call differentiation machine learning model to determine an activity type associated with the first user; and determine whether the current call is of the first call type or the second call type based at least in part on the activity type associated with the first user. Various techniques may be applied to determine the activity type associated with the first user. In one example, similar to described above with reference to step 408, the activity type associated with the first user may be predicted based on historical transactions incurred by the second user with the first user. In this scenarios, based on other pertinent information with regard to the first user, the call differentiation model may predict whether the first user's activity type is related to the activities of the first type of activity of the second user (e.g., vendor of the second user), or is related to services/goods provided by the first user himself/herself (e.g., dentist of the second user). In some embodiments, the above described activity qualifier may be updated to include the determined activity type of the first user, and in turn utilized by the call differentiation model to predict the call type for the particular call.

Figure 5:
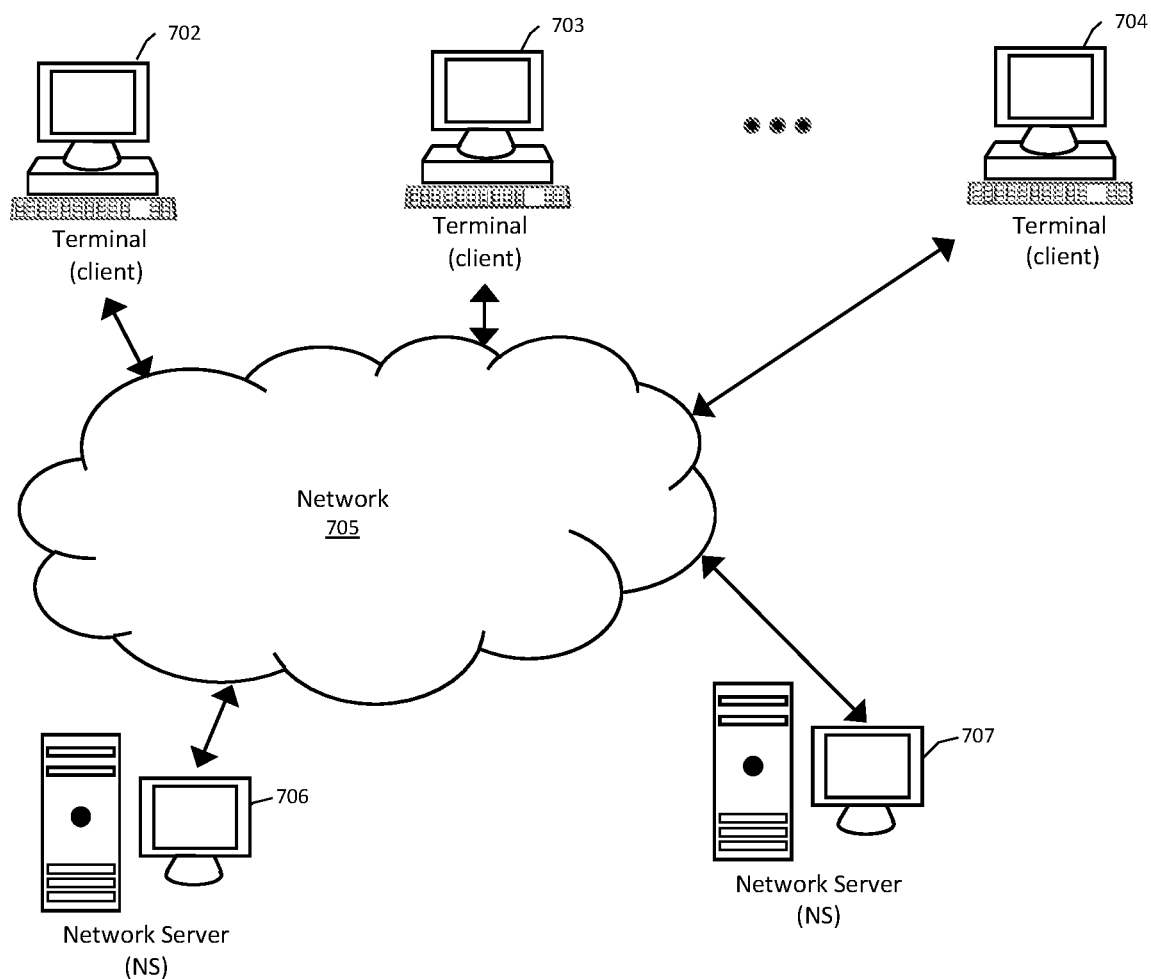
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
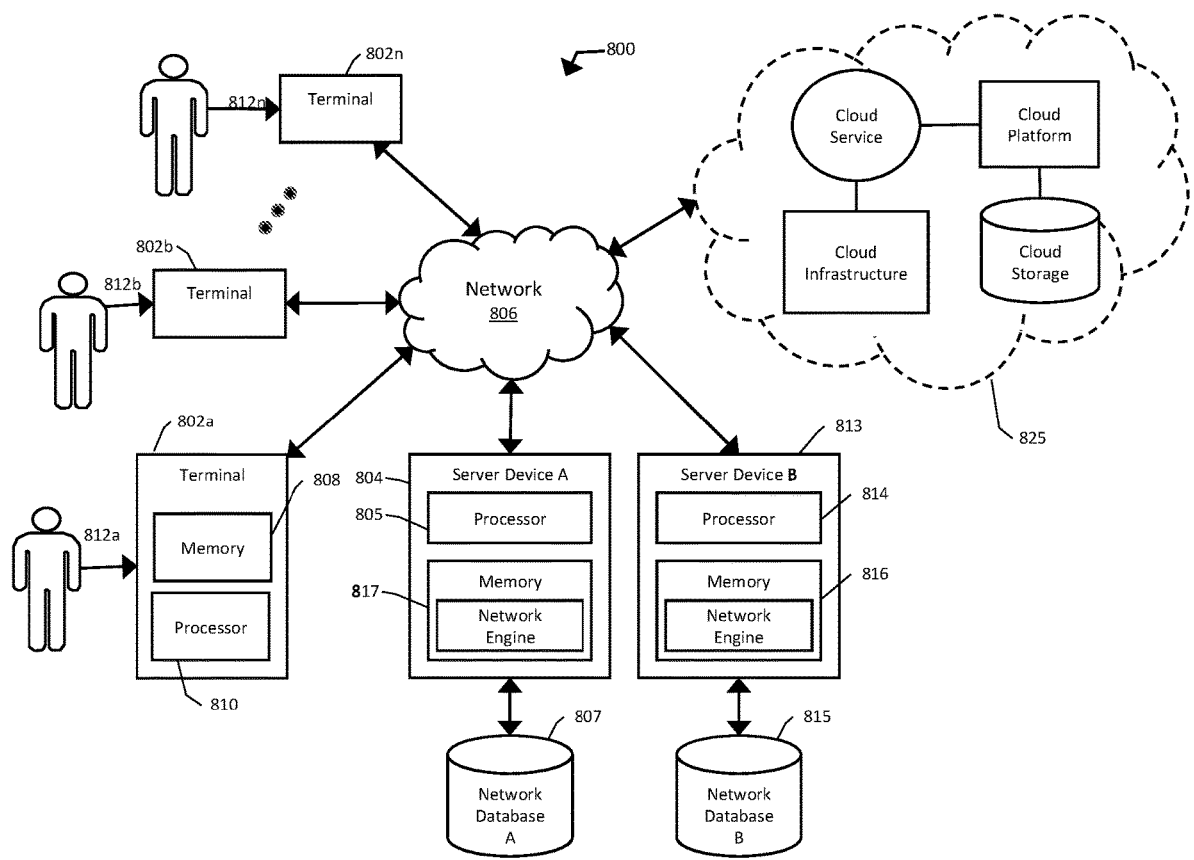
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
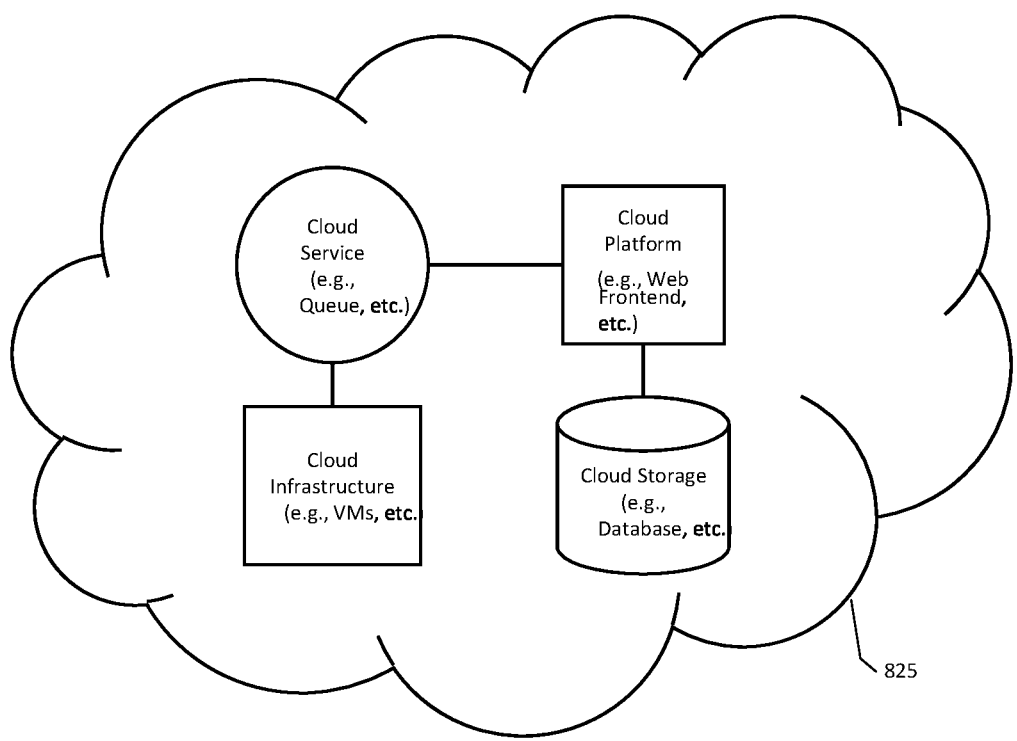
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
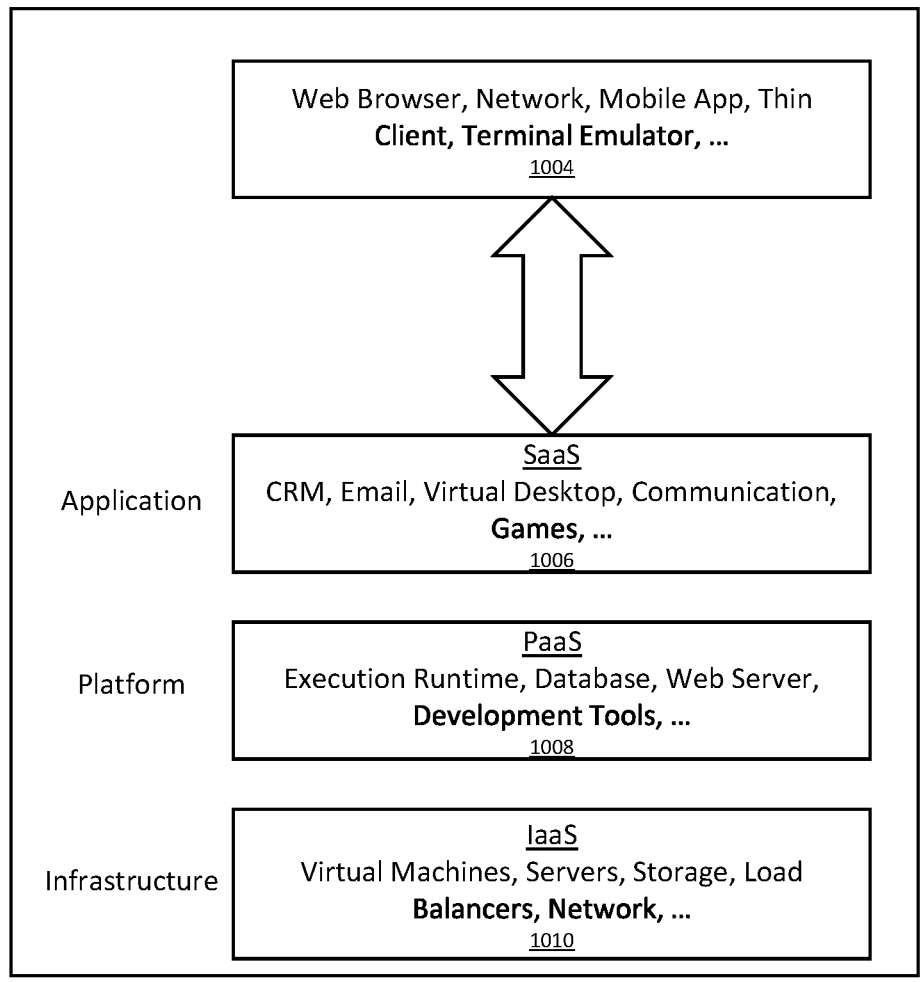

As also shown in FIGS. 7 and 8, some embodiments of the disclosed technology may also include and/or involve one or more cloud components 825, which are shown grouped together in the drawing for sake of illustration, though may be distributed in various ways. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, identified as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:
obtaining, by one or more processors, a trained call differentiation machine learning model that determines a likelihood that a particular call associated with a particular phone number is of a first call type or a second call type, wherein the first call type is associated with a first type of activity and the second call type is associated with a second type of activity;
receiving, by the one or more processors, from a computing device of a first user, a permission indicator identifying a permission by the first user to detect calls being received by the computing device;
receiving, by the one or more processors, from the computing device, an indication of a current call being received at a current time from a particular phone number that is associated with a second user;
utilizing, by the one or more processors, the trained call differentiation machine learning model to:
determine an activity type associated with the second user;
determining an activity qualifier associated with the second user based at least in part on the activity type, and determine the likelihood that the current call is of the first call type or the second call type, based at least in part on the current time and the activity qualifier; and
instructing, by the one or more processors, when the current call is of the first call type, the computing device of the first user to present to the first user, a graphical user interface (GUI) associated with the current call, wherein the GUI comprises at least one GUI element, displaying, to the first user, information related to the first type of activity of the second user.

Clause 2. The method of clause 1 or any clause herein, where the trained call differentiating
machine learning model has been trained based on:
information of a first plurality of users,
activity information associated with a first plurality of activities associated with the first plurality of users,
phone number information of a first plurality of phone numbers associated with a first plurality of calls from the first plurality of users, the first plurality of calls including calls of at least one of: the first call type or the second call type,
timing information of when the first plurality of users engaging the first plurality of activities and/or initiating the first plurality of calls, and
at least one of:
a) profile information of the first plurality of users; or
b) contextual information associated with the first plurality of users.

Clause 3. The method of clause 1 or any clause herein, where the information related to the first type of activity of the second user comprises at least one of: a title related to the first type of activity, an address related to the first type of activity, or a description of the first type of activities of the second user.

Clause 4. The method of clause 1 or any clause herein, where the call differentiation machine learning model is retrained based on feedback data from the second user, the feedback data including at least an indication whether the call is of the first call type.

Clause 5. The method of clause 1 or any clause herein, where the call is monitored to obtain feedback data with regard to whether the call is of the first call type.

Clause 6. The method of clause 1 or any clause herein, further comprising:
utilizing, by the one or more processors, the call differentiation machine learning model to determine an activity type associated with the first user; and
determining, by the one or more processors, the current call is of the second call type or the second call type, based at least in part on the activity type associated with the first user.

Clause 7. The method of clause 6 or any clause herein, where the activity type associated with the first user is determined based at least in part on a transaction incurred by the second user with the first user.

Clause 8. The method of clause 1 or any clause herein, where the activity type associated with the second user is determined based on at least a transaction incurred by the first user with the second user.

Clause 9. A system including:
one or more processors; and
a memory in communication with the one or more processors and storing instructions that, when executed by the one or more processors, cause the one or more processors to:
obtain a trained call differentiation machine learning model that determines a likelihood that a particular call associated with a particular phone number is of a first call type or a second call type, wherein the first call type is associated with a first type of activity and the second call type is associated with a second type of activity;
receive from a computing device of a first user, a permission indicator identifying a permission by the first user to detect calls being received by the computing device;
receive from the computing device, an indication of a current call being received at a current time from a particular phone number that is associated with a second user;
utilize the trained call differentiation machine learning model to:
determine an activity type associated with the second user,
determining an activity qualifier associated with the second user based at least in part on the activity type, and
determine the likelihood that the current call is of the first call type or the second call type, based at least in part on the current time and the activity qualifier; and
instruct, when the current call is of the first call type, the computing device of the first user to present to the first user, a graphical user interface (GUI) associated with the current call, wherein the GUI comprises at least one GUI element, displaying, to the first user, information related to the first type of activity of the second user.

Clause 10. The system of clause 9 or any clause herein, where wherein the trained call differentiating machine learning model has been trained based on:
information of a first plurality of users,
activity information associated with a first plurality of activities associated with the first plurality of users,
phone number information of a first plurality of phone numbers associated with a first plurality of calls from the first plurality of users, the first plurality of calls including calls of at least one of: the first call type or the second call type,
timing information of when the first plurality of users engaging the first plurality of activities and/or initiating the first plurality of calls, and
at least one of:
a) profile information of the first plurality of users; or
b) contextual information associated with the first plurality of users.

Clause 11. The system of clause 9 or any clause herein, where the information related to the first type of activity of the second user comprises at least one of: a title related to the first type of activity, an address related to the first type of activity, or a description of the first type of activities of the second user.

Clause 12. The system of clause 9 or any clause herein, where the call differentiation machine learning model is retrained based on feedback data from the second user, the feedback data including at least an indication whether the call is of the first call type.

Clause 13. The system of clause 9 or any clause herein, where the call is monitored to obtain feedback data with regard to whether the call is of the first call type.

Clause 14. The system of clause 9 or any clause herein, where the one or more processors are further caused to:
utilize the call differentiation machine learning model to determine an activity type associated with the first user; and
determine the current call is of the second call type or the second call type, based at least in part on the activity type associated with the first user.

Clause 15. A non-transitory computer readable storage medium for tangibly storing computer program instructions capable of being executed by a computer processor, the computer program instructions defining the steps of:
obtaining a trained call differentiation machine learning model that determines a likelihood that a particular call associated with a particular phone number is of a first call type or a second call type, wherein the first call type is associated with a first type of activity and the second call type is associated with a second type of activity;
receiving, from a computing device of a first user, a permission indicator identifying a permission by the first user to detect calls being received by the computing device;
receiving, from the computing device, an indication of a current call being received at a current time from a particular phone number that is associated with a second user;
utilizing the trained call differentiation machine learning model to:
determine an activity type associated with the second user,
determining an activity qualifier associated with the second user based at least in part on the activity type, and
determine the likelihood that the current call is of the first call type or the second call type, based at least in part on the current time and the activity qualifier; and
instructing, when the current call is of the first call type, the computing device of the first user to present to the first user, a graphical user interface (GUI) associated with the current call, wherein the GUI comprises at least one GUI element, displaying, to the first user, information related to the first type of activity of the second user.

Clause 16. The computer readable storage medium of clause 15 or any clause herein, the trained call differentiating machine learning model has been trained based on: information of a first plurality of users,
activity information associated with a first plurality of activities associated with the first plurality of users,
phone number information of a first plurality of phone numbers associated with a first plurality of calls from the first plurality of users, the first plurality of calls including calls of at least one of: the first call type or the second call type,
timing information of when the first plurality of users engaging the first plurality of activities and/or initiating the first plurality of calls, and
at least one of:
a) profile information of the first plurality of users; or
b) contextual information associated with the first plurality of users Clause 17. The computer readable storage medium of clause 15 or any clause herein, where the information related to the first type of activity of the second user comprises at least one of: a title related to the first type of activity, an address related to the first type of activity, or a description of the first type of activities of the second user.

Clause 18. The computer readable storage medium of clause 15 or any clause herein, where the call differentiation machine learning model is retrained based on feedback data from the second user, the feedback data including at least an indication whether the call is of the first call type.

Clause 19. The computer readable storage medium of clause 15 or any clause herein, the steps further comprising:
utilizing the call differentiation machine learning model to determine an activity type associated with the first user; and
determining the current call is of the second call type or the second call type, based at least in part on the activity type associated with the first user.

Clause 20. The computer readable storage medium of clause 19 or any clause herein, where the activity type associated with the first user is determined based at least in part on a transaction incurred by the second user with the first user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
receiving, by one or more processors, from a computing device of a first user, an indication of a current call being received at a current time from a particular phone number that is associated with a second user;
utilizing, by the one or more processors, a trained call differentiation machine learning model that determines a likelihood that a particular call associated with a particular phone number is of a first call type or a second call type, wherein the first call type is associated with a first type of activity and the second call type is associated with a second type of activity, wherein the trained call differentiation machine learning model is configured to:
determine an activity type associated with the second user,
determining an activity qualifier associated with the second user based at least in part on the activity type, and
determine the likelihood that the current call is of the first call type or the second call type, based at least in part on the current time and the activity qualifier; and
instructing, by the one or more processors, when the current call is of the first call type, the computing device of the first user to present to the first user, a graphical user interface (GUI) associated with the current call, wherein the GUI comprises at least one GUI element, displaying, to the first user, information related to the first type of activity of the second user.

2. The method of claim 1, wherein the trained call differentiating machine learning model has been trained based on:
information of a first plurality of users,
activity information associated with a first plurality of activities associated with the first plurality of users,
phone number information of a first plurality of phone numbers associated with a first plurality of calls from the first plurality of users, the first plurality of calls including calls of at least one of: the first call type or the second call type,
timing information of when the first plurality of users engaging the first plurality of activities and/or initiating the first plurality of calls, and
at least one of:
a) profile information of the first plurality of users; or
b) contextual information associated with the first plurality of users.

3. The method of claim 1, wherein the information related to the first type of activity of the second user comprises at least one of: a title related to the first type of activity, an address related to the first type of activity, or a description of the first type of activities of the second user.

4. The method of claim 1, wherein the call differentiation machine learning model is retrained based on feedback data from the second user, the feedback data including at least an indication whether the call is of the first call type.

5. The method of claim 4, wherein the call is monitored to obtain feedback data with regard to whether the call is of the first call type.

6. The method of claim 1, further comprising:
utilizing, by the one or more processors, the call differentiation machine learning model to determine an activity type associated with the first user; and
determining, by the one or more processors, the current call is of the first call type or the second call type, based at least in part on the activity type associated with the first user.

7. The method of claim 6, wherein the activity type associated with the first user is determined based at least in part on a transaction incurred by the second user with the first user.

8. The method of claim 1, wherein the activity type associated with the second user is determined based on at least a transaction incurred by the first user with the second user.

9. A system comprising:
one or more processors; and
a memory in communication with the one or more processors and storing instructions that, when executed by the one or more processors, cause the one or more processors to:
receive, from a computing device, an indication of a current call being received at a current time from a particular phone number that is associated with a second user;
utilize a trained call differentiation machine learning model that determines a likelihood that a particular call associated with a particular phone number is of a first call type or a second call type, wherein the first call type is associated with a first type of activity and the second call type is associated with a second type of activity, wherein the trained call differentiation machine learning model is configured to:
determine an activity type associated with the second user,
determining an activity qualifier associated with the second user based at least in part on the activity type, and
determine the likelihood that the current call is of the first call type or the second call type, based at least in part on the current time and the activity qualifier; and
instruct, when the current call is of the first call type, the computing device of the first user to present to the first user, a graphical user interface (GUI) associated with the current call, wherein the GUI comprises at least one GUI element, displaying, to the first user, information related to the first type of activity of the second user.

10. The system of claim 9, wherein the trained call differentiating machine learning model has been trained based on:
  information of a first plurality of users,
  activity information associated with a first plurality of activities associated with the first plurality of users,
  phone number information of a first plurality of phone numbers associated with a first plurality of calls from the first plurality of users, the first plurality of calls including calls of at least one of: the first call type or the second call type,
  timing information of when the first plurality of users engaging the first plurality of activities and/or initiating the first plurality of calls, and
  at least one of:
    a) profile information of the first plurality of users; or
    b) contextual information associated with the first plurality of users.

11. The system of claim 9, wherein the information related to the first type of activity of the second user comprises at least one of: a title related to the first type of activity, an address related to the first type of activity, or a description of the first type of activities of the second user.

12. The system of claim 9, wherein the call differentiation machine learning model is retrained based on feedback data from the second user, the feedback data including at least an indication whether the call is of the first call type.

13. The system of claim 9, wherein the call is monitored to obtain feedback data with regard to whether the call is of the first call type.

14. The system of claim 9, wherein the one or more processors are further caused to:
  utilize the call differentiation machine learning model to determine an activity type associated with the first user; and
  determine the current call is of the first call type or the second call type, based at least in part on the activity type associated with the first user.

15. A non-transitory computer readable storage medium for tangibly storing computer program instructions capable of being executed by a computer processor, the computer program instructions defining steps of:
  receiving, from a computing device, an indication of a current call being received at a current time from a particular phone number that is associated with a second user;
  utilizing a trained call differentiation machine learning model that determines a likelihood that a particular call associated with a particular phone number is of a first call type or a second call type, wherein the first call type is associated with a first type of activity and the second call type is associated with a second type of activity, wherein the trained call differentiation machine learning model is configured to:
    determine an activity type associated with the second user,
    determining an activity qualifier associated with the second user based at least in part on the activity type, and
    determine the likelihood that the current call is of the first call type or the second call type, based at least in part on the current time and the activity qualifier; and
  instructing, when the current call is of the first call type, the computing device of the first user to present to the first user, a graphical user interface (GUI) associated with the current call, wherein the GUI comprises at least one GUI element, displaying, to the first user, information related to the first type of activity of the second user.

16. The computer readable storage medium of claim 15, wherein the trained call differentiating machine learning model has been trained based on:
  information of a first plurality of users,
  activity information associated with a first plurality of activities associated with the first plurality of users,
  phone number information of a first plurality of phone numbers associated with a first plurality of calls from the first plurality of users, the first plurality of calls including calls of at least one of: the first call type or the second call type,
  timing information of when the first plurality of users engaging the first plurality of activities and/or initiating the first plurality of calls, and
  at least one of:
    a) profile information of the first plurality of users; or
    b) contextual information associated with the first plurality of users.

17. The computer readable storage medium of claim 15, wherein the information related to the first type of activity of the second user comprises at least one of: a title related to the first type of activity, an address related to the first type of activity, or a description of the first type of activities of the second user.

18. The computer readable storage medium of claim 15, wherein the call differentiation machine learning model is retrained based on feedback data from the second user, the feedback data including at least an indication whether the call is of the first call type.

19. The computer readable storage medium of claim 15, the steps further comprising:
  utilizing the call differentiation machine learning model to determine an activity type associated with the first user; and
  determining the current call is of the first call type or the second call type, based at least in part on the activity type associated with the first user.

20. The computer readable storage medium of claim 19, wherein the activity type associated with the first user is determined based at least in part on a transaction incurred by the second user with the first user.

* * * * *